C. L. CROW.
AUTOMATIC SELF HEALING INNER TUBE FOR PNEUMATIC TIRES.
APPLICATION FILED FEB. 16, 1916.

1,235,528.         Patented July 31, 1917.

Witness
J. Gordon Parker

Inventor
Charles L. Crow.
By
Robt. D. Johnson Jr
Attorney

| # UNITED STATES PATENT OFFICE.

CHARLES L. CROW, OF ALEXANDER CITY, ALABAMA.

AUTOMATIC SELF-HEALING INNER TUBE FOR PNEUMATIC TIRES.

1,235,528.

Specification of Letters Patent. Patented July 31, 1917.

Application filed February 16, 1916. Serial No. 78,708.

*To all whom it may concern:*

Be it known that I, CHARLES L. CROW, a citizen of the United States of America, residing at Alexander City, in the county of Tallapoosa and State of Alabama, have invented certain new and useful Improvements in Automatic Self-Healing Inner Tubes for Pneumatic Tires, of which the following is a specification.

My invention relates to improvements in the inner tubes of pneumatic tires and has for its object to design the tube so as to place both the inner and outer strata of its tread surface under a compression which will cause the tube, when punctured, to close the puncture and prevent leakage of air therefrom.

In accomplishing my purposes, I construct the inner tube so that its normal cross section exceeds that of the internal surface of the casing so that when the inner tube is expanded its walls are subjected to a compression as it adjusts itself to fit into the casing of smaller diameter and this brings the whole walls of the tube to a greater or less extent under compression. In addition to this feature, the outer face of the tread portion of the tube is made of substantially greater thickness than that of the inner half portion of the tube and the tread surface will have a concavo-convex shape in cross section with its concave face, when not expanded, facing outwardly toward the tread surface of the outer casing. This will cause the tube, when expanded, to change its shape so as to bring the inside strata of its tread portion under considerable compression but at the same time it will result in subjecting the outer strata of its tread portion if left smooth to a tension strain so that punctures, while tending to be healed by the inner strata, will be stretched in the outer strata. In order to avoid this latter feature which is most undesirable, I have designed the tread portion of the tire or inner tube with its outer face circumferentially fluted or ridged to provide in the outer strata thereof a surplus of material so that as the tube is expanded and the outer strata changes from a concave to a convex shape this surplus material will be sufficient to prevent a tension and, in the case of an inner tube which is expanded against the outer casing, to create a compression in the outer strata.

In the preferred design of my tube both the inner and outer strata of the tread portion are circumferentially grooved or corrugated as by this means I am enabled to obtain a more uniform surface compression in the expanded tire. In order to reduce to a minimum the quantity of rubber required for the tire or tube, I have shown the same as having its inner half portion opposite the rim formed of thin rubber which is reinforced by an external layer of cloth so designed as to prevent the stretching of this thinner portion and to protect it from rim cutting or side punctures. This cloth reinforcement prevents the thinner portion of the tube stretching so that it will become misplaced as it is expanded in the outer casing and at the same time it is flexible enough to permit the compression of the tube, resulting from its being crowded into a casing of smaller perimeter, to increase the density of this inner portion of the tube as well as its capacity to resist rim cutting.

My invention further comprises the novel details of construction and arrangement of parts which in their preferred embodiments are hereinafter more fully described and claimed, reference being had to the accompanying drawings, wherein:—

Similar reference numerals refer to similar parts throughout the drawings.

Figure 1:
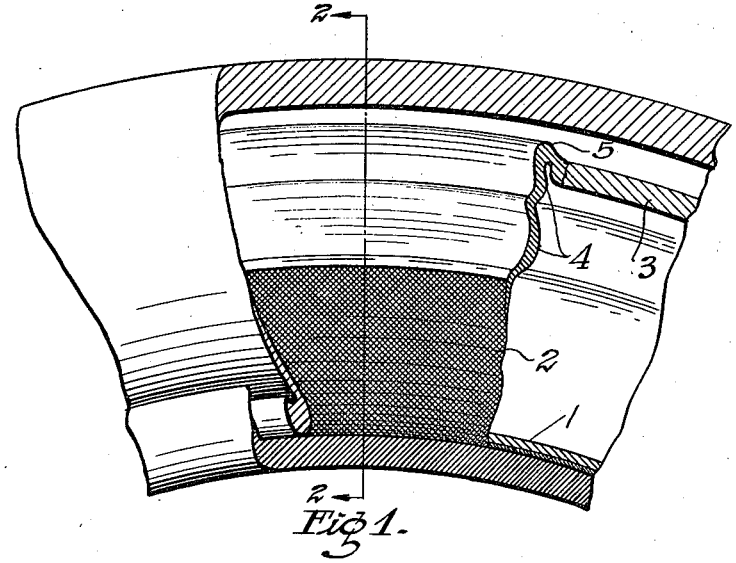
Figure 1 is a partial side elevation of a tire having its inner tube constructed in accordance with my invention and shown in partially expanded condition.
Figure 2:
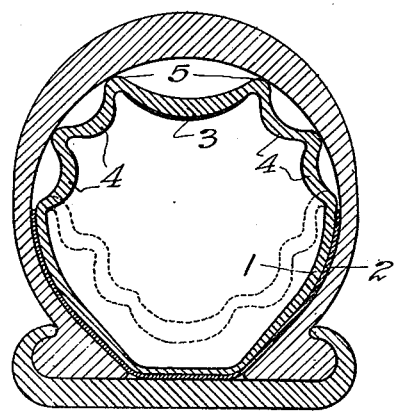
Fig. 2 is a cross section on the line 2—2 of Fig. 1.
Figure 3:
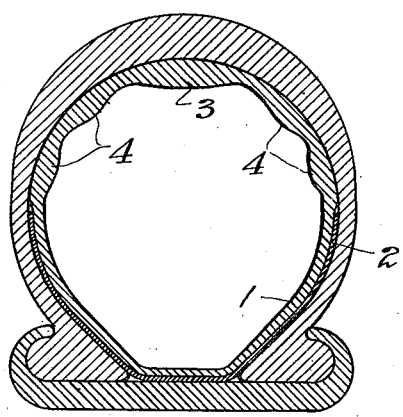
Fig. 3 is a view similar to Fig. 2, but showing the tube in fully expanded position.

I have illustrated my invention in Figs. 1 to 3 as an inner tube having its inner half portion formed of thin rubber reinforced by an outer layer of fabric 2 which prevents undue stretching and protects the thin rubber. The outer half of the tube comprises a concavo-convex tread portion 3 which is thickened on its inner face and in which unexpanded condition presents a normal outer circumferential face. The concave outer circumferential face. The tube, between its walls 1 and the tread portion 2, is provided with circumferential corrugations 4 which are thickened along their center portions and, when unexpanded, present outwardly facing circumferential concave surfaces. By this arrangement the full expansion of the tube, as shown in Fig. 3, will force a compression of the rubber throughout the tube in transverse cross section and in addition thereto in forcing the concavo-convex portions 3 and 4 outwardly, it will accomplish two results, namely, the inside strata will be additionally compressed, due to its change in shape from convex to concave, and the outer strata, as a whole, will be put under substantial compression by reason of the surplus material provided in the ridges 5. I thus obtain a compression in both the inner and outer surface strata of the tube which increases its capacity to heal punctures and avoids any tendency in the outer surface or strata to spread or expand the puncture.

Figure 4:
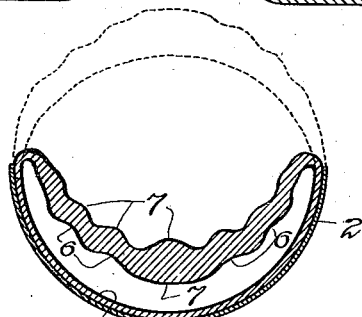
Fig. 4 is a view of a modification of my invention forming either a tire or inner tube.

In Fig. 4 the outer half of the tube or tire is shown as formed by a body which gradually increases in thickness from its sides to its circumferential center and on each face is provided with circumferential corrugations 6 and ridges 7. These ridges and corrugations are provided in the outer strata of the tread portion with a surplus of material so that such strata will be under compression when the inner tube is expanded against the outer casing. The surplus material on the inner strata will be just sufficient to bring that strata to the desired compression so that it will be self healing in the event of puncture.

It will be apparent, from a consideration of Fig. 2, that the tube is larger than the bore of the outer casing and this is the means for effecting the compression throughout the tube when fully expanded, as shown in Fig. 3.

The fabric lining 2 is cut in such manner that it will be non-elastic and it is vulcanized on the portion of the inner tube where it is intended for use, thereby forming a permanent part of the tube. Obviously the fabric could be omitted by thickening the inner half portion of the tube, but I consider it preferable to reduce the quantity of rubber used and the elasticity of this inner section of the tube.

Having thus described my invention, what I claim as new and desire to secure by Letters Patent, is:—

1. A tube for pneumatic tires comprising a circumferential integral tread portion, the tread portion being formed with its outer surface concave and with outwardly facing convex ridges alternating with inwardly facing convex ridges, said ridges giving the tread axially thereof a corrugated transverse section thickest along the center lines of the ridges, the perimeter of the tube being greater than the perimeter of the tire casing adapted to receive the same, and the surplus of material in the outwardly facing convex ridges being sufficient to equalize the stretching of the outer concave surfaces between said latter ridges due to the full expansion of the tube against the casing.

2. A tube for pneumatic tires comprising a circumferential integral tread portion, the tread portion being formed with its outer surface concave and with outwardly facing convex ridges alternating with inwardly facing convex ridges, said ridges giving the tread axially thereof a corrugated transverse section thickest along the center lines of the ridges, the ridges increasing in thickness from the sides to the center of the tread surface of the tube, the perimeter of the tube being greater than the perimeter of the tire casing adapted to receive the same, and the surplus of material in the outwardly facing convex ridges being sufficient to equalize the stretching of the outer concave surfaces between said latter ridges due to the full expansion of the tube against the casing.

In testimony whereof I affix my signature.

CHARLES L. CROW.

Witnesses:
 L. A. HARRIS,
 J. F. THOMAS.